(12) United States Patent
Bono et al.

(10) Patent No.: US 11,928,516 B2
(45) Date of Patent: Mar. 12, 2024

(54) GREENER SOFTWARE DEFINED STORAGE STACK

(71) Applicant: EMC IP Holding Company LLC, Hopkinton, MA (US)

(72) Inventors: Jean-Pierre Bono, Westboro, MA (US); Thomas Fridtjof Dahl, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 206 days.

(21) Appl. No.: 17/242,025

(22) Filed: Apr. 27, 2021

(65) Prior Publication Data
US 2022/0342705 A1   Oct. 27, 2022

(51) Int. Cl.
*G06F 9/50* (2006.01)

(52) U.S. Cl.
CPC ............ *G06F 9/505* (2013.01); *G06F 9/5094* (2013.01); *G06F 9/5083* (2013.01); *G06F 2209/5012* (2013.01)

(58) Field of Classification Search
None
See application file for complete search history.

(56) References Cited

U.S. PATENT DOCUMENTS

| | | | | |
|---|---|---|---|---|
| 8,555,287 | B2* | 10/2013 | Ding | H04L 47/823 718/104 |
| 10,452,792 | B1* | 10/2019 | Flaherty | G06F 3/0653 |
| 10,817,348 | B2* | 10/2020 | Dimnaku | G06F 9/505 |
| 2015/0127858 | A1* | 5/2015 | Sarkar | G06F 9/45558 710/18 |
| 2015/0199388 | A1* | 7/2015 | Hrischuk | G06F 3/0635 707/802 |
| 2016/0259742 | A1* | 9/2016 | Faulkner | G06F 3/0653 |
| 2017/0242729 | A1* | 8/2017 | Chen | H04L 41/5025 |
| 2018/0210656 | A1* | 7/2018 | Sato | G06F 3/067 |
| 2018/0287955 | A1* | 10/2018 | Fitzgerald | H04L 41/0896 |
| 2019/0205157 | A1* | 7/2019 | Bianchini | G06F 9/5044 |
| 2019/0220315 | A1* | 7/2019 | Vallala | G06F 11/1482 |
| 2020/0117507 | A1* | 4/2020 | Payton | G06F 9/505 |
| 2020/0218676 | A1* | 7/2020 | Cao | G06F 13/1668 |
| 2021/0004357 | A1* | 1/2021 | Bagchi | G06F 16/25 |
| 2021/0160155 | A1* | 5/2021 | Wright | H04L 41/5009 |
| 2021/0176266 | A1* | 6/2021 | Ramamurthy | G06F 9/5072 |
| 2021/0200702 | A1* | 7/2021 | Longo | G06F 3/0659 |

* cited by examiner

*Primary Examiner* — Abu Zar Ghaffari (74) *Attorney, Agent, or Firm* — Chamberlain, Hrdlicka, White, Williams & Aughtry; Aly Z. Dossa (57) ABSTRACT

A method for managing client resources by receiving a desired load factor representing the number of instructions being executed per second (IOPS) to implement an application on a set of cores of a client device, based on the desired load factor and a latency factor, determining a maximum number of IOPS that can be executed by the cores of the client device before reaching system saturation, determining a pattern of the IOPS being executed on the set of cores based on historical IOPS information for the latency factor, and based on the historical IOPS information, determining to execute the IOPS on a subset of the set of cores.

13 Claims, 7 Drawing Sheets

GREENER SOFTWARE DEFINED STORAGE STACK

BACKGROUND

Resources of a computer system or a system including a multitude of computer systems are currently underutilized or overutilized but not distributed in their utilization. Lack of resource distribution may cause higher power consumption than necessary and possibly system performance saturation.

SUMMARY

In general, in one aspect, the invention relates to a method for managing client device resources. The method includes receiving a desired load factor representing the number of instructions being executed in input/output operations per second (IOPS) to implement an application on a set of cores of a client device, based on the desired load factor and a latency factor, determining a maximum number of IOPS that can be executed by the cores of the client device before reaching system saturation, determining a pattern of the IOPS being executed on the set of cores based on historical IOPS information for the latency factor, and based on the historical IOPS information, determining to execute the IOPS on a subset of the set of cores.

In general, in one aspect, the invention relates to a non-transitory computer readable medium that includes instructions which, when executed by a computer processor, enable the computer processor to perform a method for managing client device resources. The method includes receiving a desired load factor representing the number of instructions being executed in input/output operations per second (IOPS) to implement an application on a set of cores of a client device, based on the desired load factor and a latency factor, determining a maximum number of IOPS that can be executed by the cores of the client device before reaching system saturation, determining a pattern of the IOPS being executed on the set of cores based on historical IOPS information for the latency factor and based on the historical IOPS information, determining to execute the IOPS on a subset of the set of cores.

In general, in one aspect, the invention relates to a method for managing client device resources. The method includes receiving a desired load factor representing the number of instructions being executed in input/output operations per second (IOPS) to implement an application on a set of client devices of a system, based on the desired load factor and a latency factor, determining a maximum number of IOPS that can be executed by the system before reaching system saturation, determining a pattern of the IOPS being executed on the set of client devices based on historical IOPS information for the latency factor, and based on the historical IOPS information, determining to execute the IOPS on a subset of the set of client devices.

Other aspects of the invention will be apparent from the following description and the appended claims.

DETAILED DESCRIPTION

Power consumption of conventional large computing systems is environmentally unfriendly, costly, and inefficient. While inefficient power consumption may be tolerable in fewer numbers, i.e., a handful of computing devices, each computing device accumulatively contributes to a scaled system—thousands of computing devices—which results in considerably more energy consumption. Moreover, proper system operation may be compromised when cooling is inadequate. Without the benefit of proper cooling mechanisms, device parts may overheat giving rise to the failure of one or more corresponding computing devices or an entire system.

One of the causes of power inefficiency is poor workload management. Given a specific latency, a workload (e.g., reading a file or writing to a database) is carried out by execution of input/output operations per second (IOPS) by one or more computing device cores, and in many scenarios, by a multitude (e.g., thousands or tens of thousands) of computing devices. IOPS execution consumes power. When distributed randomly or poorly managed, a computing device, or a system made of a multitude of computing devices, suffers from workload distribution imbalance leading to unfavorable cooling effects and higher than necessary power consumption, not to mention performance inefficiency.

To overcome the aforementioned limitations, a system and method for resource allocation is disclosed. The number of cores or processors of a computing device, or a system, respectively, executing workloads by a software agent or instance is adjusted in accordance with the use or burden placed on these resources. Further disclosed is workload distribution across computing devices of the system. Such resource allocation, whether among cores of each computing device, across computing devices, or both, reduces power consumption, increases system efficiency, and promotes cooling effects.

Various embodiments of the invention are described below.

Figure 1:
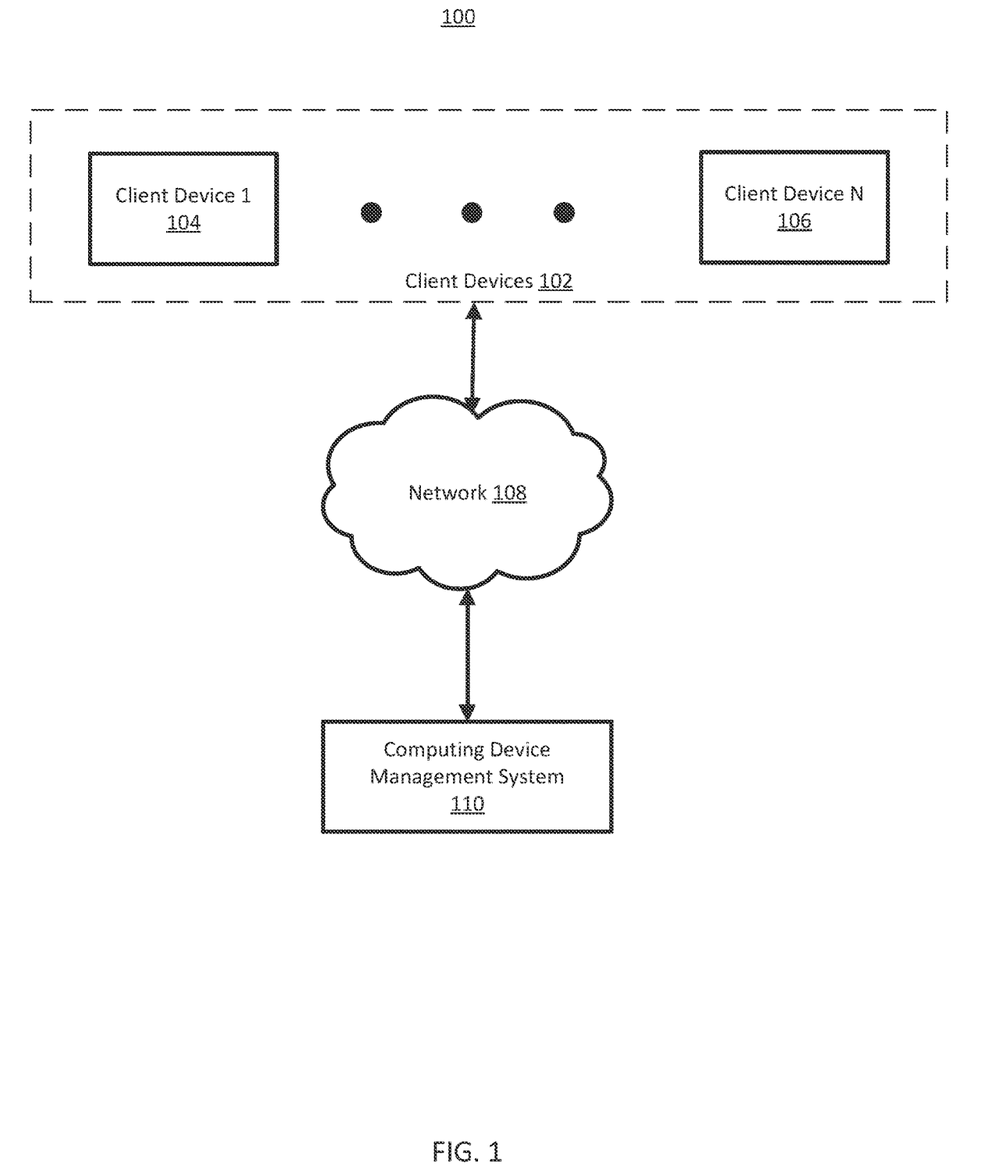
FIG. 1 shows a diagram of a system in accordance with one or more embodiments of the invention.

FIG. 1 shows a diagram of a system in accordance with one or more embodiments of the invention. The system (100) includes one or more client device(s) (104)-(106), operatively connected to a network (108), which is operatively connected to a computing device management system (110). The components illustrated in FIG. 1 may be connected via any number of operable connections supported by any combination of wired and/or wireless networks (e.g., network (108)). Each component of the system of FIG. 1 is discussed below.

In some embodiments of the invention, the computing device management system (110) may be absent and the network (108) and the client device(s) (104)-(106) remain communicatively coupled to each other. In some embodiments of the invention, the computing device management system (110) is a sub-system made of more than one computing device management system (110). For example, each client device may be assigned an associated computing device management system. In some embodiments of the invention, the client device(s) (104)-(106) and the computing device management system (110) may be directed communicatively coupled to one another without going through the network (108).

In one embodiment of the invention, client device(s) (104)-(106) are configured to manage power consumption among corresponding cores based on the workload of the cores, to be directed to undergo workload changes, and to generally interact with the computing device management system (described below).

In one or more embodiments of the invention, client device(s) (104)-(106) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one embodiment of the invention, the client device(s) (104)-(106) are each a physical or virtual device that may be used for performing various embodiments of the invention. The physical device may correspond to any physical system with functionality to implement one or more embodiments of the invention. For example, the physical device may be a device or a part of or incorporated in a system with at least one or more processor(s) and memory.

Alternatively, the physical device that corresponds to a client device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device that corresponds to a client device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, each of the client device(s) (104)-(106) includes executable instructions (stored in a non-transitory computer readable medium (not shown), which when executed, enable the client device to perform one or more methods described below (see e.g., FIGS. 3, 4).

In one or more embodiments of the invention, client device(s) (102) may request data and/or send data to the computing device management system (110). Further, in one or more embodiments, client device(s) (102) may initiate or resume execution of an application of a workload by executing on one or more cores of corresponding client device(s) (see FIG. 2) such that the application may itself gather, transmit, and/or otherwise manipulate data on the client device (e.g., node(s) (104)-(106)), received from computing device management system (110), remote to the client device(s) or from one or more other client device(s). In one or more embodiments, one or more client device(s) (104)-(106) may share access to the same one or more computing device management system (110) and may similarly share any data located on computing device management system (110).

In embodiments facilitating power consumption measures within a client device (e.g., FIG. 2), the client device may include an operating system, executing on one or more internal processors that accommodates and manages a power consumption process, such as described herein (e.g., FIGS. 3 and 4), within the client device. In an example embodiment, the operating system may be a Linux kernel deploying and managing execution of applications (e.g., application programming interfaces (APIs)) of a workload.

In embodiments facilitating power consumption measures across client device(s) (e.g., FIG. 3), the computing device management system (110) may include an operating system, executing on one or more client devices that accommodates and manages a power consumption process, such as described herein (e.g., FIGS. 3 and 4), across the client devices. In an example embodiment, the operating system may be a Linux kernel deploying and managing execution of applications (e.g., application programming interfaces (APIs)) of workloads across client device(s).

In embodiments facilitating power consumption measures within and across client device(s), the client devices and/or the computing device management system (110) may include an operating system, executing on the cores of the client devices and on one or more client devices that accommodates and manages a power consumption process, such as described herein (e.g., FIGS. 3 and 4), within and across the client devices. In an example embodiment, the operating system within each client device and in the computing device management system (110) may be a Linux kernel deploying and managing execution of applications (e.g., APIs) of workloads within and across client device(s), respectively.

In one or more embodiments of the invention, network (108) of the system is a collection of connected network devices that allows for the communication of data from one network device to other network devices, or the sharing of resources among network devices. Examples of a network (e.g., network (108)) include, but are not limited to, a local area network (LAN), a wide area network (WAN) (e.g., the Internet), a mobile network, or any other type of network that allows for the communication of data and sharing of resources among network devices and/or devices (e.g., clients (104)-(106), computing device management system (110)) operatively connected to the network (108). In one embodiment of the invention, the client device(s) (104)-(106) are operatively connected to the computing device management system (110) via a network (e.g., network (108)).

An embodiment of a client device of the client device(s) (104)-(106) is provided in FIG. 2 below.

While FIG. 1 shows a specific configuration of a system, other configurations may be used without departing from the scope of the disclosure. For example, although the client device(s) (104)-(106) and the computing device management system (110) are shown to be operatively connected through network (108), client devices(s) (104)-(106) and the computing device management system (110) may be directly connected, without an intervening network (e.g., network (108)). Further, the functioning of the client device(s) (104)-(106) and the computing device management system (110) is not dependent upon the functioning and/or existence of the other device(s) (e.g., computing device management system (110) and client devices(s) (104)-(106), respectively). Rather, the client device(s) (104)-(106) and the computing device management system (110) may function independently and perform operations locally that do not require communication with other devices. Accordingly, embodiments disclosed herein should not be limited to the configuration of devices and/or components shown in FIG. 1.

Figure 2:
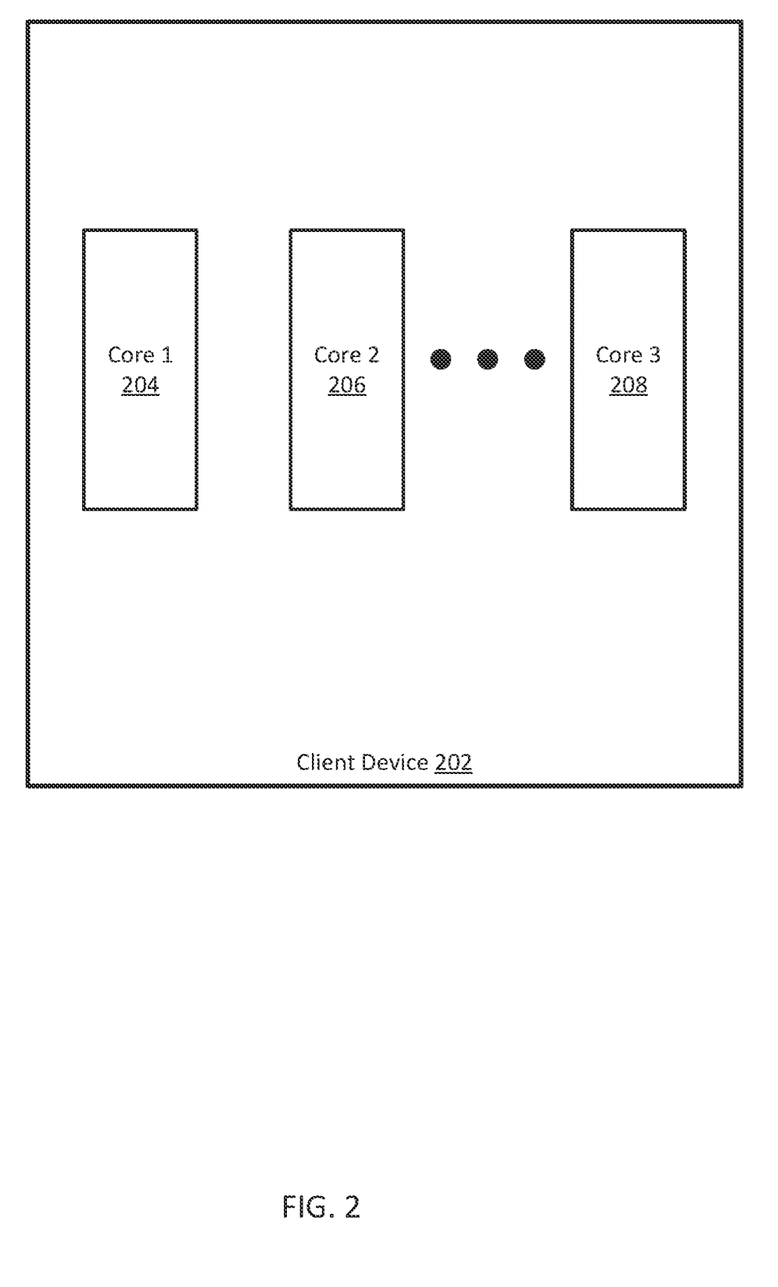
FIG. 2 shows a diagram of a client device in accordance with one or more embodiments of the invention.

FIG. 2 shows a diagram of a client device (202) in accordance with one or more embodiments of the invention. In one embodiment of the invention, client device (202) includes one or more cores (e.g., core 1 (204), core 2 (206) through core 3 (208)). In one or more embodiments of the invention, the client device (202) is configured to perform all, or a portion, of the functionality described in FIGS. 4-5.

In one embodiment of the invention, each of the cores (204), (206), and (208) of the client device (202) is configured to process workloads by, for example, executing one or more applications from a computing device management system (e.g., 110, FIG. 1).

In one or more embodiments of the invention, each of the cores of the client device (202) is implemented as a computing device. A computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one embodiment of the invention, each of the cores of the client device (202) is a physical or virtual device that may be used for performing various embodiments of the invention. The physical device may correspond to any physical system with functionality to implement one or more embodiments of the invention. For example, the physical device may be a device or a part of or incorporated in a system with at least one or more processor(s) and memory.

Alternatively, the physical device that corresponds to a core of the client device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device that corresponds to a core of the client device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, each of the cores of the client device (202) includes executable instructions (stored in a non-transitory computer readable medium (not shown), which when executed, enable the core to execute one of more of the workloads, as described in FIGS. 3, 4, and 5 below.

In one or more embodiments of the invention, one or more application containers (not shown) may be software executing on one of the cores of the client device (202). In one embodiment of the invention, one or more application containers may execute on a core of the client device (202) to facilitate processing of a workload. In an embodiment of the invention, distribution of workloads across the cores 1 (204)-3 (208) is based on latency and the number of IOPS. In an example embodiment, an operating system (e.g., Linux kernel) executing on one or more processors of the client device (202) manages the power consumed by the client device (202) by distributing workloads across the cores 1 (204)-3 (208) based on a desired load factor. In an embodiment of the invention, the client device (202) performs a process of managing power distribution across the cores 1 (204)-3 (208) by determining a prediction of the number of IOPS to be executed on each of the cores based on historical IOPS data, such as described below relative to FIG. 4.

Figure 3:
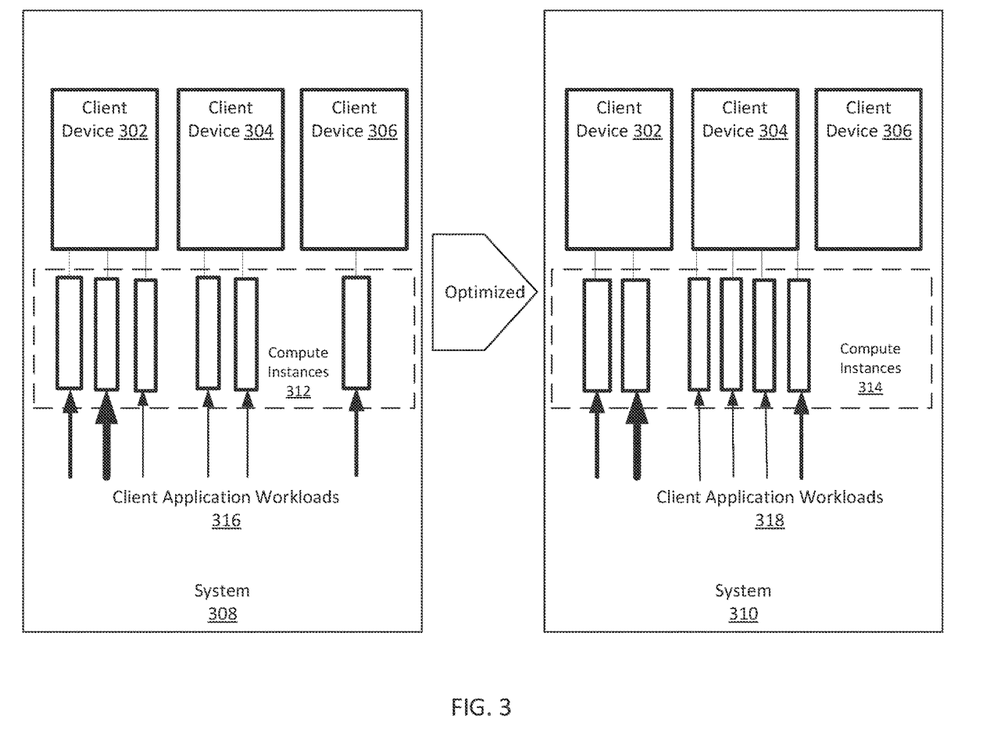
FIG. 3 shows an example of a system in accordance with one or more embodiments of the invention.

FIG. 3 shows a diagram of a system in accordance with one or more embodiments of the invention. The system (308) includes one or more client device(s) (302)-(306), operatively in communication with compute instances (312). In an embodiment of the invention, each of the client devices (302)-(306) corresponds to the client device (202) (FIG. 2). While three client devices are shown in the embodiment of FIG. 3, it is understood that a greater or fewer number of client devices may be employed without departing from the spirit of the invention.

The system (308) is pre-optimized in that client application workloads (316) are nearly randomly assigned to each of the client devices with little to no regard for thoughtful resource distribution, particularly with power consumption in mind Whereas, the same system, system (310) is optimized pushing the workload processed by the client device (306) in system (308) to the client device (304) thereby freeing up the client device (306). The client device (306) may be accordingly in sleep or low power consumption mode.

In one embodiment of the invention, each of the client devices (302)-(306) may be configured to manage workload distribution by execution of software on an operating system (e.g., Linux) directing the operating system to effectuate efficient power consumption, based on workload burden, among the client devices (302)-(306). The workload distribution is based on the latency and IOPS associated with each workload. Generally, the higher the latency, the greater the IOPS may be. In some embodiments of the invention, a computing device management system (e.g., 110, FIG. 1) may facilitate power consumption measures by executing software on an operating system directing the operating system to effectuate power consumption measures based on workload burden. In either the case of the client devices directing the operating system to effectuate power consumption or a computer device management system doing the same, the compute instances are executed by the operating system to direct it to balance the resources across the client devices (302)-(306), as shown in the pre-optimization case and the post optimization case in FIG. 3.

In one or more embodiments of the invention, each of the client devices (302)-(306) may be implemented as a computing device. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource. Further details of a client device is provided in FIG. 7.

In one embodiment of the invention, the client devices (302)-(306) may each be a physical or virtual device that may be used for performing various embodiments of the invention. The physical device may correspond to any physical system with functionality to implement one or more embodiments of the invention. For example, the physical device may be a device or a part of or incorporated in a system with at least one or more processor(s) and memory.

Alternatively, the physical device that corresponds to a client device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device that corresponds to a client device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, each of the client devices (302)-(306) includes executable instructions (stored in a non-transitory computer readable medium (not shown), which when executed, enable the client device to perform one or more methods described below (see e.g., FIGS. 4, 5).

In one or more embodiments of the invention, client devices (302)-(306) may request data and/or send data to a computing device management system (e.g., 110, FIG. 1). Further, in one or more embodiments, client devices (302)-(306) may initiate or resume execution of an application of a workload such that the application may itself gather, transmit, and/or otherwise manipulate data on the client device, received from the computing device management system or another client device that is remotely or locally located. In one or more embodiments, one or more computing device management system may share access to the same one or more computing device management system and may similarly share any data located on computing device management system.

In one embodiment of the invention, each of the compute instances (312) and the compute instances (314) may be a virtual device that may be used for performing various embodiments of the invention. As a virtual device or software agent, a compute instance may be a part of, incorporated in, or coupled to a computing device (e.g., a server) performing the functions and processes described herein. To this end, and in a non-limiting example, a compute instance may be a server instance. In an embodiment of the invention, each of the compute instances (312) and (314) are software-defined objects on behalf of which a client device (e.g., (302)-(306)) performs work. The software-define nature of the compute instances makes the compute instances relatively tractable to reschedule the work done by the client devices (302)-(306) on behalf of the compute instances (312), (314) in order to accomplish the overall power-saving goal of various embodiments of the invention.

Referring still to FIG. 3, each of the client devices (302)-(306) of the system (308) (pre-optimization) carries a distinct load although it is possible for one or more client devices to carry the same load. Each client device therefore has a load factor consistent with the workload it is executing at any given time. In the example of FIG. 3 and without limitation, the client device (302) of the system (308) is executing three compute instances of the compute instances (312), each with a different workload. A first workload, represented by the thickness of left-most arrow in FIG. 3, in system (308), presents less load burden to the client device (302) than the load factor presented by the second workload, which is represented by the thickness of the second arrow from the left. The third load burden, represented by the thickness of the third arrow from the left, presents the least load factor of all 3 workloads. The load factor each of the 2 workloads of the client device (304) present, pre-optimization, are about equal to each other, as represented by the thickness of the two client application workload (316) arrows shown going to the compute instances (312) and ultimately to client device (304) of the system (308). The client device (306) executes one or more applications of a single workload, represented by the thickness of the arrow to the compute instances (312) and ultimately to the client device (306). Because the workload of the client device (306) is one and the overall burden placed on the client device (306) is relatively low, as represented by the thickness of the arrow ultimately going to the client device (306), and because the client device (304) would not reach saturation (failure or inoperability), the system (308) pushes the single workload from the client device (306) to the client device (304) to relieve the client device (306) of processing any workload, shown by the system (310). The client device (304) goes from processing 3 workloads to processing 4 workloads without reaching saturation. Accordingly, the system (310) utilizes a subset of the set of client devices (302)-(306) after optimization relative to pre-optimization. Further details of the process for managing the distribution of workloads is provided below relative to FIG. 5.

Other components not illustrated in FIG. 1 may perform or assist in performing the method of FIG. 3 without departing from the invention.

Figure 4:
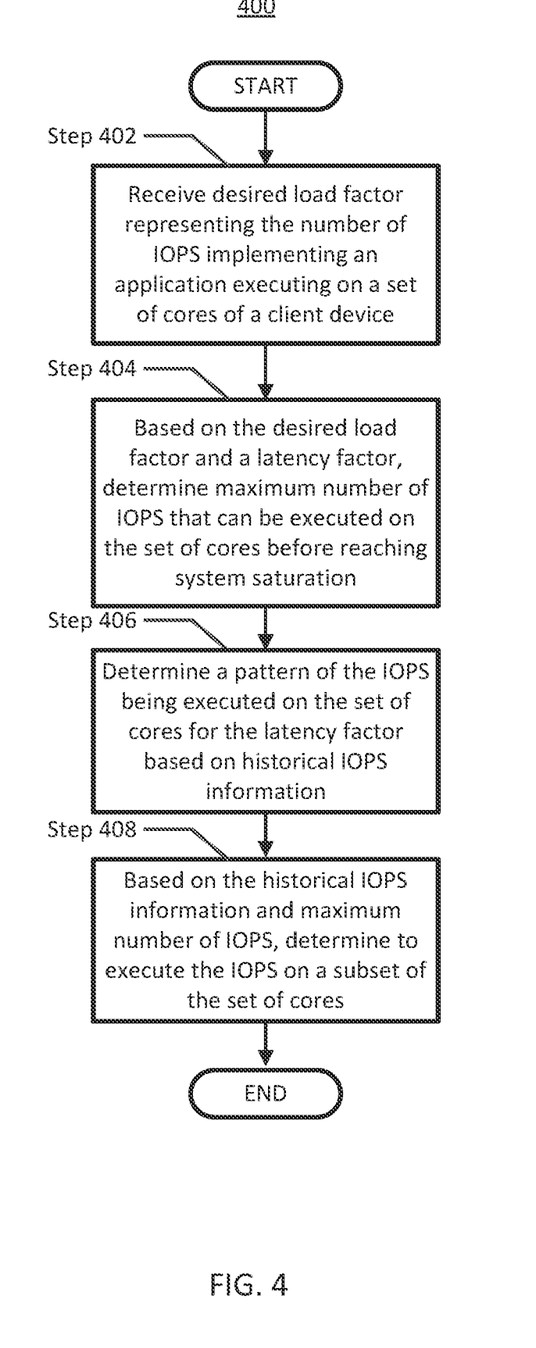
FIG. 4 shows a flowchart of a method of managing client device resources in accordance with one or more embodiments of the invention.

FIG. 4 shows a flowchart describing a method for managing resources of a client device in accordance with one or more embodiments described herein. The method of FIG. 4 may be performed by, for example, client device (200) of FIG. 2 or the system (308) of FIG. 3. Other components not illustrated in these figures may perform or assist in performing the method of FIG. 4 without departing from the invention.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At step 402, the client device receives a desired load factor representing the number of IOPS that may be implementing an application executing on a set of cores (e.g., core 1 (204)-core (208)), FIG. 2) of the client device. The desired load factor may be information determined by the operating system executing on the client device or from a process or device located externally to the client device.

At step 404, based on the desired load factor (from step 402) and a latency factor associated with the workload executing on each core, the client device determines a maximum number of IOPS that can be executed on the set of cores before reaching system saturation. Based on the maximum number of IOPS at any given time, the minimum number of cores at any given time for executing the workloads may be determined. From time to time, the client device may determine the burden a workload is imposing on the software executing on the operating system, for example, by measuring the IOPS of the execution. Based on the determined burden, the client device may adjust the workload on the software to push some of the burden on a core of the client device to another core of the same or a different client device to free the former core of execution to enter a power savings mode whereas the latter core may be executing additional IOPS but without reaching saturation. The client device learns to fall short of reaching a core's saturation level by making a prediction determination as described below.

At step 406, the client device determines a pattern of the number of IOPS to be executed on the set of cores for the desired latency factor based on the historical number of IOPS. In an example embodiment, a model may be machine learning trained, using historical IOPS information, to determine a predicted upward or a predicted downward trend of the number of IOPS expected to be executed. During operation, the model may be utilized to determine an expected upward trend or an expected downward trend of the number of IOPS expected to be executed. The input to the model may be latency and the number of IOPS required for execution of a workload on the software executing on an operating system. Example machine learning algorithms for training the model are supervised and unsupervised types of algorithms.

At step 408, based on the historical IOPS information (from step 406) and the maximum number of IOPS (from step 404), the client device determines to execute the IOPS on a subset of the set of cores of the client device thereby reducing the number of cores executing applications of a workload, realizing system power reduction, efficiency, and cooling effects.

Figure 5:
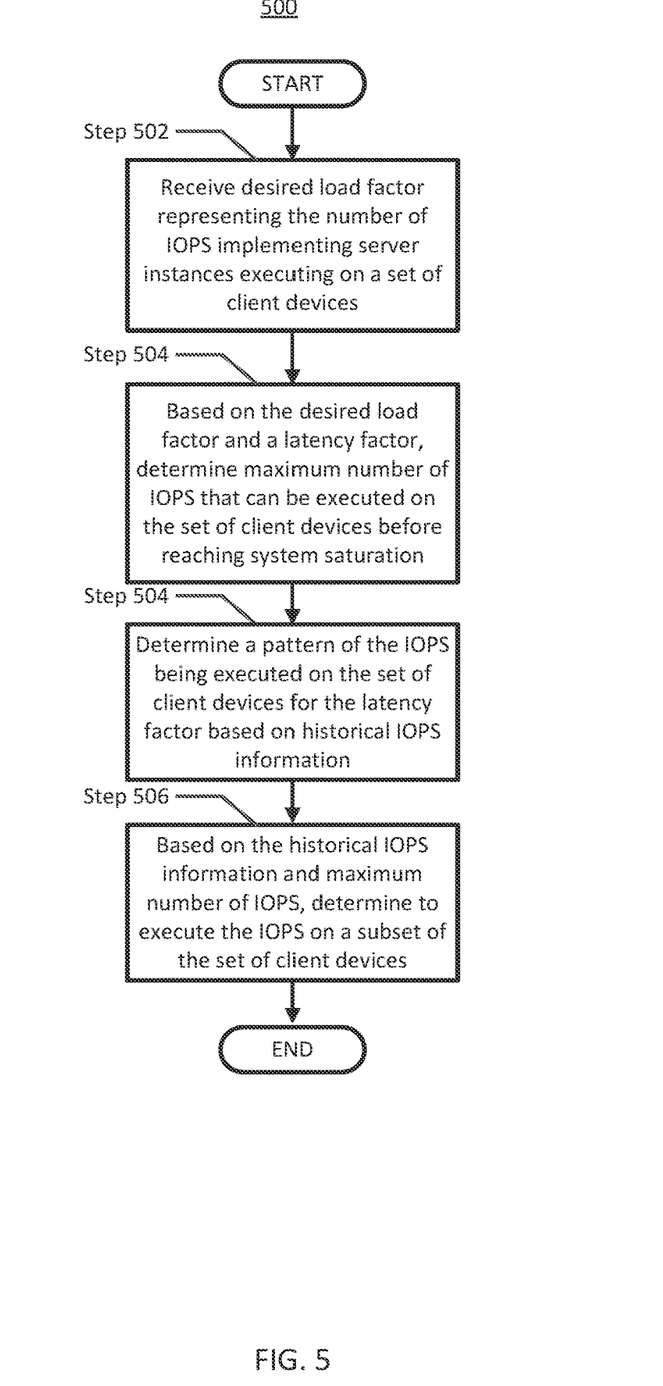
FIG. 5 shows a flowchart of a method of managing system resources in accordance with one or more embodiments of the invention.

FIG. 5 shows a flowchart describing a method for managing resources of a system in accordance with one or more embodiments described herein. The method of FIG. 5 may be performed by, for example, the system (308) of FIG. 3. Other components not illustrated in these figures may perform or assist in performing the method of FIG. 5 without departing from the invention.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At step 502, a desired load factor representing the number of IOPS implementing server instances executing on a set of client devices (e.g., client devices 302-306 of system (308), FIG. 3) is received. In an embodiment of the invention, a server instance corresponds to a compute instance, such as provided and described relative to FIG. 3. The desired load factor may be manually programmed or automatically determined. A desired load factor may be based on the number of available cores or client devices and the number of IOPS that can be executed comfortably before either core or client device saturation may be reached, at any given time, for a particular latency.

At step 504, based on the desired load factor and the latency factor (from step 502), a determination is made of the maximum number of IOPS that can be executed on the set of client devices before reaching the saturation level of the set of client devices. At step 504, a pattern is determined of the IOPS being executed by the set of client devices for the specific latency factor based on historical IOPS information. Further discussions of the pattern determination and historical IOPS information follow relative to FIG. 6. At step 506, based on the historical IOPS information and the maximum number of IOPS, a determination is made to execute the IOPS on a subset (a reduced set) of the set of client devices (e.g., client devices 302 and 304 of system (310), FIG. 3).

Figure 6:
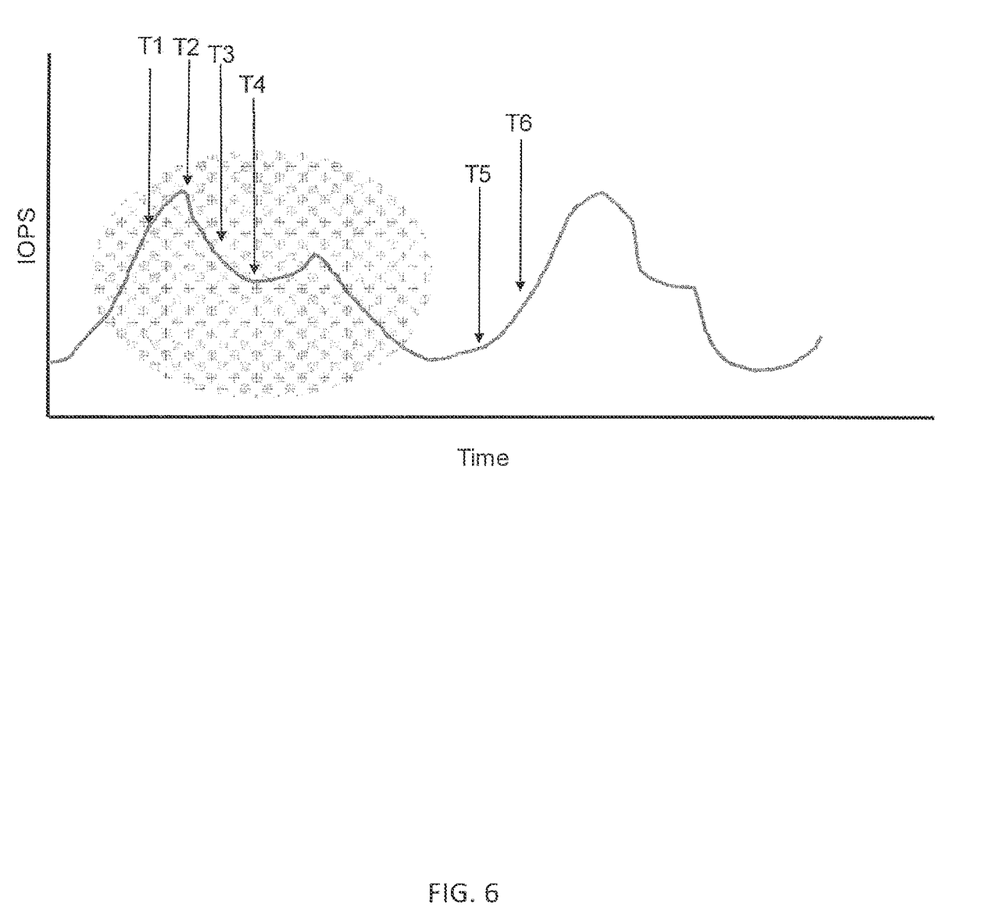
FIG. 6 shows an exemplary graph in accordance with one or more embodiments of the invention.

FIG. 6 shows an exemplary graph in accordance with one or more embodiments of the invention. The horizontal axis represents time and the vertical axis represents the number IOPS. Accordingly, the graph of FIG. 6 represents the number of IOPS over time. At any given time, a system (308, FIG. 3) or a client device (e.g., 202, FIG. 2) may experience the number of IOPS represented by the vertical axis for a particular latency. The oval encloses a part of the graph in FIG. 6 representing a specific range of the number of IOPS over a specific range of time where a pattern of historical IOPS information has been determined. For example, and without limitation, the client device (202) of FIG. 2 may determine a pattern in the number of IOPS that the cores 1 (204)-3 (208) have historically executed. Or, the computing device management system (110) of FIG. 1 may detect a similar pattern by that of the client devices (302)-(306) rather than the cores 1 (204)-3 (208). In some embodiments of the invention, a pattern may be detected by use of a trained model with inputs being the IOPS (historical IOPS information) and associated latency. The model may implement a machine learning algorithm to assist in finding a pattern. The machine learning algorithm may be supervised or unsupervised. The part of the graph of FIG. 6 that is outside of the enclosed oval represents the number of IOPS over a specific time period where no particular pattern has been detected from the IOPS historical data.

Relative to time, T1, the number of IOPS being executed for various workloads is expected to increase at time, T2. Accordingly, when making a decision to possibly reduce a set of cores to a subset or to reduce a set of client devices to a subset, the client device, or another device or process making such determination, may choose to maintain the set as is because the expected number of IOPS to be executed is increased from T1 to T2. Whereas, when making a determination from time, T3, to time, T4, the determination may result in a reduced set of cores or client devices because the expected number of IOPS to be executed is reduced from T3 to T4. From time, T5, to time, T6, no such determination can be made because the graph during this time period indicates the lack of a pattern in the number of IOPS being executed.

In some embodiments of the invention, a set of cores or a subset of cores may determine to increase the number of resources, i.e., cores, for example, when determining the workload is expected to increase based on historical IOPS information. Analogously, in embodiments employing client devices, such as in FIG. 3, the number of compute instances or client devices may be increased when a workload increase is expected to occur based on historical IOPS information. In some embodiments of the invention, the number of resources may be increased when workload is expected to increase above a threshold.

In some embodiments of the invention, the determination to reduce the number of cores or client devices executing workload may be based on power consumption of the subset of the set of the cores or client devices, respectively. For example, when the number of IOPS to be executed on the subset of the set of cores or client devices is below a threshold, a determination may be made not to execute the IOPS on the subset of the set of cores and when the number of IOPS to be executed on the subset of the set of cores or client devices is determined to be above a threshold, a determination may be made to execute the IOPS on the subset of the set of cores.

In some embodiments of the invention, the determination to reduce the set of cores or client devices may be based on a combination of power consumption and the number of IOPS expected to be executed at a future time.

In yet some embodiments of the invention, the determination to reduce the set of cores or client devices may be based on the amount of memory of the client device (202, FIG. 2) or system (308, FIG. 3), respectively. For example, while the number of IOPS is expected to experience a downward trend, such as shown during time period T3 to T4 in the graph of FIG. 6, a determination may be made to maintain the set of cores or client devices due to lack of adequate memory, and vice versa. In some embodiments of the invention, the determination to reduce the set of cores or client devices may be based on a combination of memory available and the number of IOPS expected to be executed at a future time.

Figure 7:
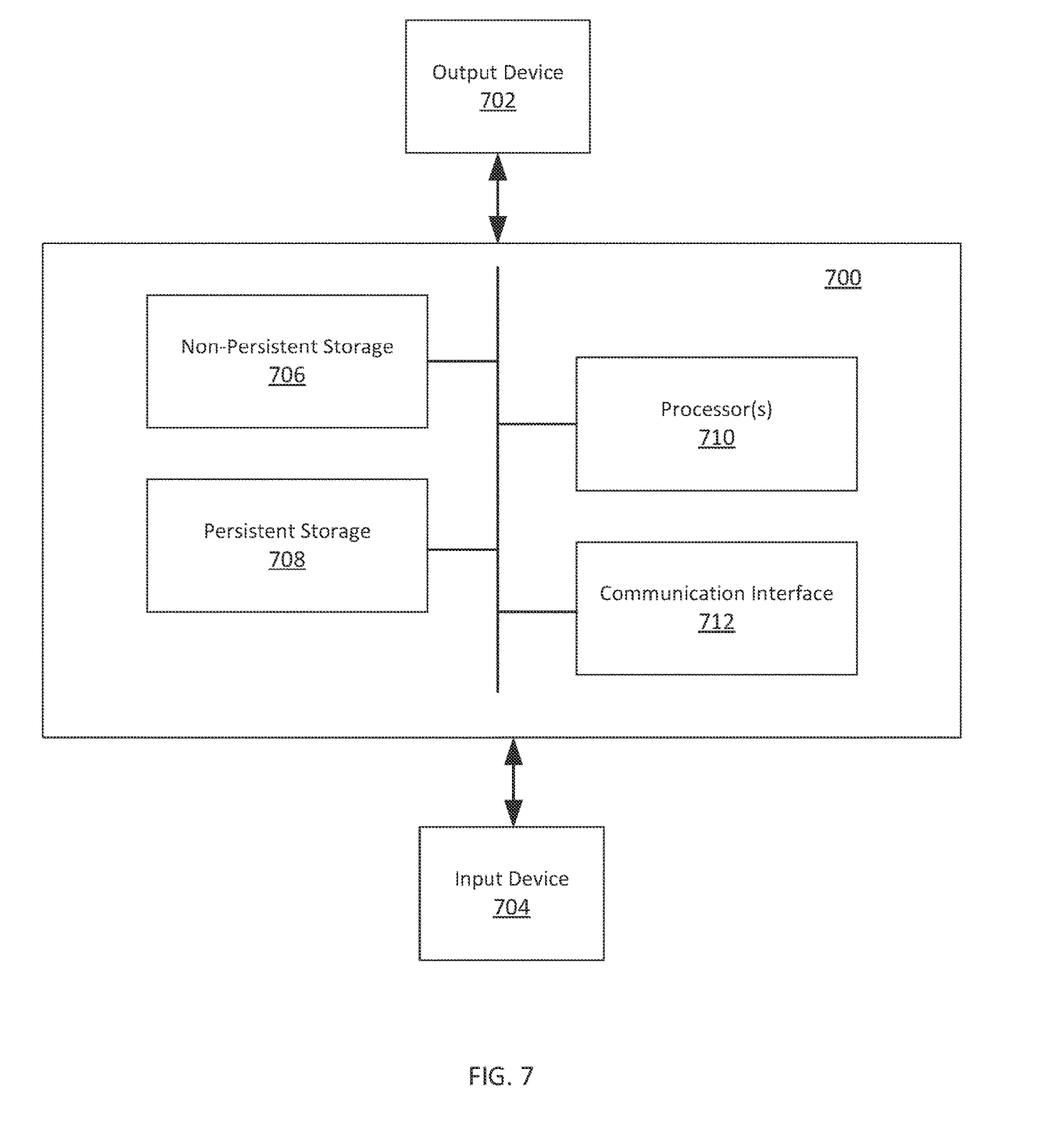
FIG. 7 shows an example of a system in accordance with one or more embodiments of the invention.

As discussed above, embodiments of the invention may be implemented using computing devices. FIG. 7 shows a diagram of a computing device in accordance with one or more embodiments of the invention. The computing device (700) may implement an embodiment of a client device (e.g., (102), in FIG. 1; (202), in FIG. 2) or a computing device management system (e.g., (110) in FIG. 1). The computing device (700) may include one or more computer processors (710), non-persistent storage (706) (e.g., volatile memory, such as random access memory (RAM), cache memory), persistent storage (708) (e.g., a hard disk, an optical drive such as a compact disk (CD) drive or digital versatile disk (DVD) drive, a flash memory, etc.), a communication interface (712) (e.g., Bluetooth® interface, infrared interface, network interface, optical interface, etc.), input devices (704), output devices (702), and numerous other elements (not shown) and functionalities. Each of the components illustrated in FIG. 7 is described below.

In one embodiment of the invention, the computer processor(s) (710) may be an integrated circuit for processing instructions. For example, the computer processor(s) may be one or more cores or micro-cores of a processor. The computing device (700) may also include one or more input devices (704), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (702), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (710), non-persistent storage (706), and persistent storage (708). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of managing client device resources comprising:
   receiving a desired load factor representing a number of instructions executed in input/output operations per second (IOPS) to implement an application on a set of cores of the client device;
   based on the desired load factor and a received latency factor of the application, determining a maximum number of IOPS that can be executed by the set of cores of the client device before reaching system saturation on the set of cores;
   determining a pattern of the IOPS being executed on the set of cores by using a received historical IOPS information for the received latency factor as an input to a machine learning model;
   based on the pattern, the desired load factor, the received latency factor, and the maximum number of IOPS, determining to execute the application on at least one core of the set of cores, wherein the at least one core is a minimum number of cores to execute the application; and
   executing the application on the at least one core.

2. The method of claim 1, wherein the received historical IOPS information represents a first number of IOPS executed at a time prior to a current time.

3. The method of claim 2, wherein determining the pattern based on the received historical IOPS information further comprises determining that a second number of IOPS to be executed by the set of cores is lower than a third number of IOPS currently being executed by the set of cores.

4. The method of claim 1, further comprising:
   making a second determination based on the received historical IOPS information that a first number of IOPS to be executed by the set of cores is higher than a second number of IOPS currently being executed by the set of cores;
   determining, based on the second determination, to execute the application on at least one additional core in addition to the at least one core; and
   executing the application one the at least on additional core in addition to the at least one core.

5. A non-transitory computer readable medium comprising computer readable program code, which when executed by a computer processor enables the computer processor to perform a method for client device resource management, the method comprising:
   receiving a desired load factor representing a number of instructions executed in input/output operations per second (IOPS) to implement an application on a set of cores of a client device;
   based on the desired load factor and a received latency factor of the application, determining a maximum number of IOPS that can be executed by the set of cores of the client device before reaching system saturation on the set of cores;
   determining a pattern of the IOPS being executed on the set of cores by using a received historical IOPS information for the received latency factor as an input to a machine learning model;
   based on the pattern, the desired load factor, the received latency factor, and the maximum number of IOPS, determining to execute the application on at least one core of the set of cores, wherein the at least one core is a minimum number of cores to execute the application; and
   executing the application on the at least one core.

6. The non-transitory computer readable medium of claim 5, wherein the received historical IOPS information represents a first number of IOPS executed at a time prior to a current time.

7. The non-transitory computer readable medium of claim 6, wherein the determining based on the received historical IOPS information comprises determining that a second number of IOPS to be executed by the set of cores is lower than a third number of IOPS currently being executed by the set of cores.

8. The non-transitory computer readable medium of claim 5, further comprising:
   making a second determination based on the received historical IOPS information that a first number of IOPS to be executed by the set of cores is higher than a second number of IOPS currently being executed by the set of cores;
   determining, based on the second determination, to execute the application on at least one additional core in addition to the at least one core;
   executing the application on the at least one additional core in addition to the at least one core.

9. A method of managing system resources comprising:
   receiving a desired load factor representing a number of instructions executed in input/output operations per second (IOPS) to implement an application on a set of client devices;
   based on the desired load factor and a received latency factor of the application, determining a maximum number of IOPS that can be executed by the system before reaching system saturation on the set of client devices;
   determining a pattern of the IOPS being executed on the set of client devices by using a received historical IOPS information for the received latency factor as an input to a machine learning model;
   based on the pattern, the desired load factor, the received latency factor, and the maximum number of IOPS, determining to execute the application on at least one client device of the set of client devices, wherein the at least one client device is a minimum number of client devices to execute the application; and
   executing the application on the at least one client device.

10. The method of claim 9, wherein the received historical IOPS information represents a first number of IOPS executed at a time prior to a current time.

11. The method of claim 10, wherein the determining based on the received historical IOPS information comprises determining that a second number of IOPS to be executed by the set of client devices is lower than a third number of IOPS currently being executed by the set of client devices.

12. The method of claim 9, further comprising:
   making a second determination based on the received historical IOPS information that a first number of IOPS to be executed by the set of client devices is higher than a second number of IOPS currently being executed by the set of client devices;
   determining, based on the second determination, to execute the application on at least one additional client device in addition to the at least one client device; and
   executing the application on the at least one additional client device in addition to the at least one client device.

13. The method of claim 9, wherein determining to execute the application on the at least one client device of the set of client devices is further based on memory availability of the set of client devices.

* * * * *